(12) United States Patent
Lee et al.

(10) Patent No.: US 8,745,540 B2
(45) Date of Patent: Jun. 3, 2014

(54) ACCORDION STYLE BREAD CRUMBING FOR MOBILE APPLICATIONS

(75) Inventors: Jongwoo Lee, San Francisco, CA (US);
Sravanthi Deshmukh, Milpitas, CA (US); Ted Wong, San Francisco, CA (US)

(73) Assignee: Apollo Education Group, Inc., Phoenix, AZ (US)

( * ) Notice: Subject to any disclaimer, the term of this patent is extended or adjusted under 35 U.S.C. 154(b) by 0 days.

(21) Appl. No.: 13/446,301

(22) Filed: Apr. 13, 2012

(65) Prior Publication Data
US 2013/0275921 A1    Oct. 17, 2013

(51) Int. Cl.
*G06F 3/0482* (2013.01)
(52) U.S. Cl.
USPC ............ 715/855; 715/777; 715/754; 715/764
(58) Field of Classification Search
USPC ....................................................... 715/854
See application file for complete search history.

(56) References Cited

U.S. PATENT DOCUMENTS

| | | | | |
|---|---|---|---|---|
| 7,373,614 | B1* | 5/2008 | Holmes ......................... | 715/855 |
| 2003/0001890 | A1* | 1/2003 | Brin ............................. | 345/753 |
| 2004/0160463 | A1* | 8/2004 | Battles et al. ................. | 345/814 |
| 2004/0261035 | A1* | 12/2004 | Emerson et al. ............... | 715/777 |
| 2006/0123353 | A1* | 6/2006 | Matthews et al. .............. | 715/779 |
| 2006/0123361 | A1* | 6/2006 | Sorin et al. ..................... | 715/854 |
| 2006/0271858 | A1* | 11/2006 | Yolleck et al. ................. | 715/738 |
| 2007/0067733 | A1* | 3/2007 | Moore et al. ................... | 715/777 |
| 2008/0005686 | A1* | 1/2008 | Singh ............................. | 715/764 |
| 2008/0077879 | A1* | 3/2008 | Black ............................. | 715/784 |
| 2008/0235578 | A1* | 9/2008 | Heed et al. ..................... | 715/269 |
| 2009/0044150 | A1* | 2/2009 | Liu et al. ........................ | 715/854 |
| 2009/0063547 | A1* | 3/2009 | Wright et al. .................. | 707/102 |
| 2009/0164934 | A1* | 6/2009 | Bhattiprolu et al. .......... | 715/777 |
| 2009/0172531 | A1* | 7/2009 | Chen et al. ..................... | 715/702 |
| 2009/0327947 | A1* | 12/2009 | Schreiner et al. ............. | 715/777 |
| 2010/0235733 | A1* | 9/2010 | Drislane et al. ............... | 715/702 |

* cited by examiner

*Primary Examiner* — William Bashore
*Assistant Examiner* — Reza Nabi
(74) *Attorney, Agent, or Firm* — Hickman Palermo Truong Becker Bingham Wong LLP

(57) ABSTRACT

Techniques are provided for navigating through a hierarchy of views while generating a bread-crumb display that continues to provide an indication of each ancestor view even when the labels for all ancestor views do not fit within the bread-crumb display. When the bread-crumb display does not have sufficient room remaining to accommodate the label of a view to which the user has navigated, the current content of the bread-crumb display contracts, like an accordion, to make room for the new label. The contracted version of the bread-crumb display continues to have an indication of all traversed levels, though the labels for some or all of the ancestor views may be partially or completely obscured. The contracted version of the bread-crumb display may be expanded, and used to navigate back up the hierarchy.

23 Claims, 18 Drawing Sheets

ACCORDION STYLE BREAD CRUMBING FOR MOBILE APPLICATIONS

FIELD OF THE INVENTION

The present invention relates to view navigation and, more specifically, to techniques to facilitate navigating among views that are hierarchically related.

BACKGROUND

The amount of information that is electronically accessible is currently enormous, and is increasing daily. With so much available information, the difficulty often becomes how to find specific information, and how to navigate through that information once found.

For example, information is often presented in "views", which may take the form of windows, screen displays, etc. Frequently, the quantity of available information is such that attempting to put all of the information in a single view is impractical. For example, it would be extremely cumbersome to navigate through a phone book that was presented in a single, enormous, scrollable window. The problem of navigation is exacerbated for users of client devices with relatively-small displays, such as typical mobile devices and tablets.

One technique that has been used to facilitate navigation among views that are organized in a hierarchical relationship. 'Bread Crumbing' is a technique used to help navigate through a hierarchy of data. That is, bread crumbing involves keeping track of the location of the current view, within a hierarchy of views, and displaying to the user the names of the views that are above the "current view" in the hierarchy. The views that are above the current view in the hierarchy are referred to herein as the "ancestor views" of the current view. The visual presentation of the names of the ancestor views is referred to herein as the "bread-crumb display".

For example, consider the folder hierarchy illustrated in FIG. 1. File systems typically have a mechanism to allow users to start at a view that corresponds to the root of the hierarchy (e.g. the "computer" node in FIG. 1), and to traverse down the file hierarchy by navigating from parent folder to child folder. As a user navigates from a parent folder to a child folder, the breadcrumb display is updated. FIGS. 2A to 2E illustrate how a typical bread-crumb display appears as the user navigates from the computer node to Folder8 in the hierarchy illustrated in FIG. 2.

Specifically, in FIG. 2A, the current view is the view of Folder2, and the bread-crumb display has the labels "Computer", "Local Disk (C:)" and "Folder2", in that order. As the user navigates down one level from Folder2 to Folder3, the bread-crumb display is updated to include the label "Folder3" after "Folder2", as illustrated in FIG. 2B. As the user navigates down one level from Folder3 to Folder5, the bread-crumb display is updated to include the label "Folder5" after "Folder3", as illustrated in FIG. 2C. As the user navigates down one level from Folder5 to Folder6, the bread-crumb display is updated to include the label "Folder6" after "Folder5", as illustrated in FIG. 2D. Finally, as the user navigates down one level from Folder6 to Folder8, the bread-crumb display is updated to include the label "Folder8" after "Folder6", as illustrated in FIG. 2E.

As is illustrated in FIGS. 2D and 2E, there may be insufficient space to include the labels of all of the ancestor views in the region that is allocated for the bread-crumb display. Specifically, to make room for the label "Folder6", the label "Computer" has shifted out of the bread-crumb display in FIG. 2D. Similarly, to make room for the label "Folder8", the label "Local Disk (C:)" has shifted out of the bread-crumb display in FIG. 2E. When labels have shifted out of the bread-crumb display, a "missing labels" control (illustrated as "<<" in FIGS. 2D and 2E) may be provided. Activation of the missing labels control causes a pop-up window to be displayed, where the pop-up window lists the labels that have scrolled out of the bread-crumb display due to insufficient room.

In the example illustrated in FIGS. 2A-2E, the labels for a relatively large number of hierarchical levels are able to fit in the bread-crumb display because the bread-crumb display is large and the labels are relatively short. However, when relatively small displays, such as those found on most mobile devices, are involved, and/or when the labels are relatively long, the bread-crumb display may accommodate very few labels. Consequently, it is more likely that a user will lose a sense of where the current view resides within the view hierarchy. For example, the bread-crumb display in FIG. 2E conveys nothing about the level of the current folder ("folder 8") other than that the current folder is at least at five levels deep. Thus, based on the bread-crumb display in FIG. 2E the user would not know whether the current folder is seven levels deep in the view hierarchy, or twenty levels deep in the view hierarchy.

In light of the foregoing, it is clearly desirable to provide an improved bread-crumb display to facilitate navigation though a hierarchy of views. It is particularly important to facilitate navigation on devices, such as mobile devices, that cannot accommodate large bread-crumb displays.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

General Overview

Techniques are described herein for navigating through a hierarchy of views while generating a bread-crumb display that continues to provide an indication of each ancestor view even when the labels for all ancestor views do not fit within the bread-crumb display. According to one embodiment, when the bread-crumb display does not have sufficient room remaining to accommodate the label of a view to which the user has navigated, the current content of the bread-crumb display contracts, like an accordion, to make room for the new label. The contracted version of the bread-crumb display continues to have an indication of all traversed levels, though the labels for some or all of the ancestor views may be partially or completely obscured.

In addition, a mechanism is provided by which the user can expand a contracted bread-crumb display to fully display the label of any given ancestor view. In response to activation of an indicator, on the bread-crumb display, that corresponds to an ancestor view, the ancestor view is established as the current view, and the bread-crumb display is updated accordingly. Various techniques are provided for animating transitions during navigation to further assist the user in keeping track of the position of the current view within the view hierarchy.

Example View Hierarchy

Techniques for navigating through a hierarchy of views using an accordion-style bread-crumb display shall be illustrated herein in the context of an online classroom application that employs a hierarchy of views. However, it should be noted that an online classroom application is merely one of a virtually limitless number of contexts in which accordion-style bread-crumb displays may be employed. For example, accordion-style bread-crumb displays may be employed in browsers to facilitate the navigation of web pages, in file systems to facilitate the navigation of the folder hierarchy, and in any application that allows navigation through a hierarchy of views.

Figure 1:
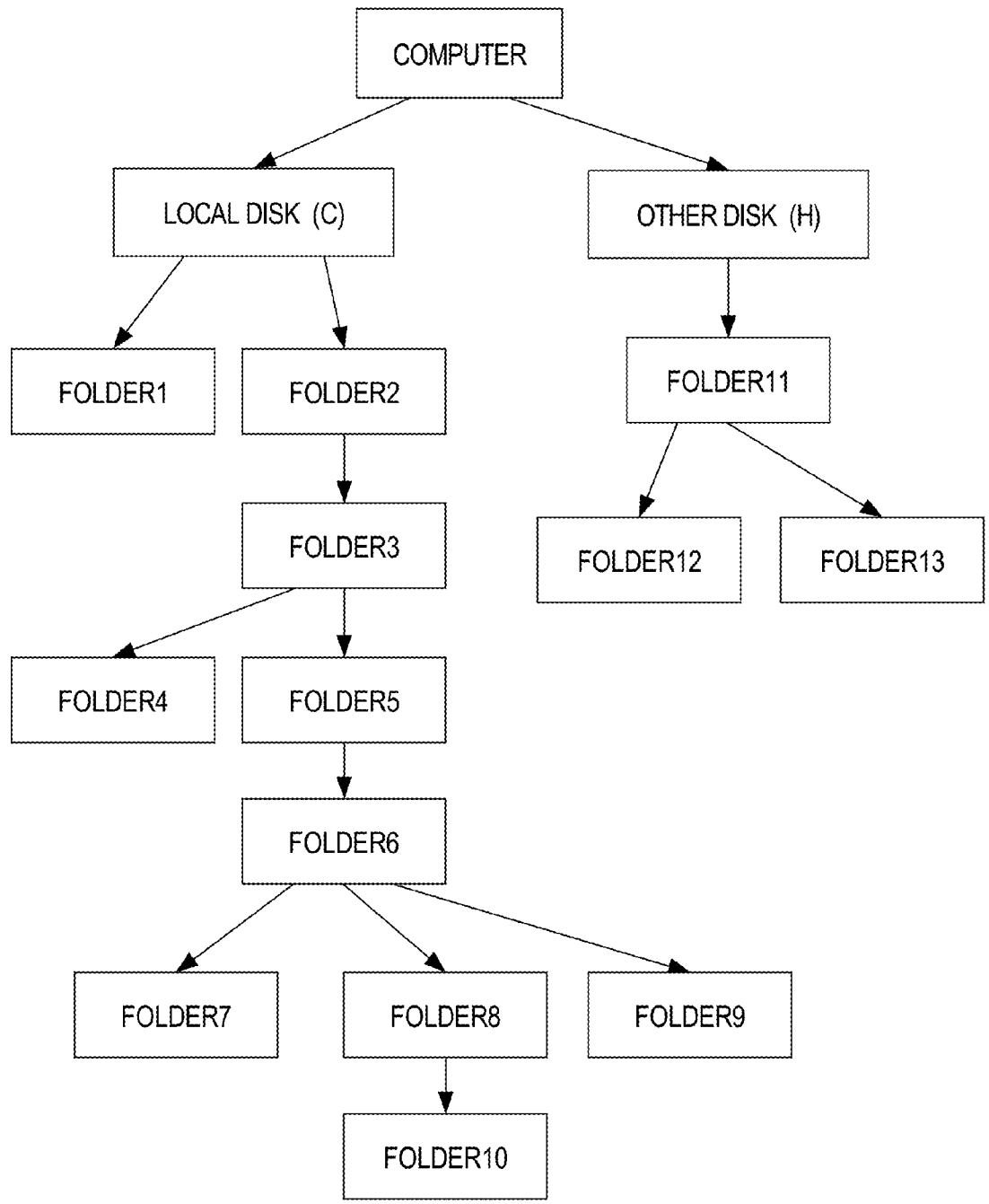
FIG. 1 is a block diagram that illustrates an example hierarchy of views.
Figure 2A:
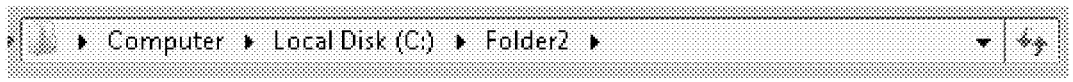
FIGS. 2A-2E are block diagrams that illustrate a prior art bread-crumb display, where labels that do not fit within the display are scrolled out of the display.
Figure 2B:
Figure 2C:
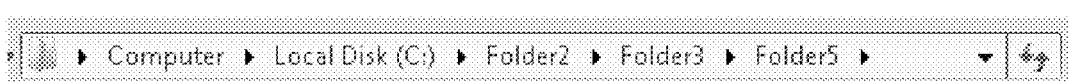
Figure 2D:
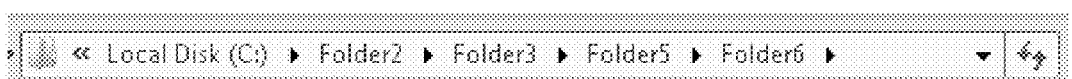
Figure 2E:
Figure 3:
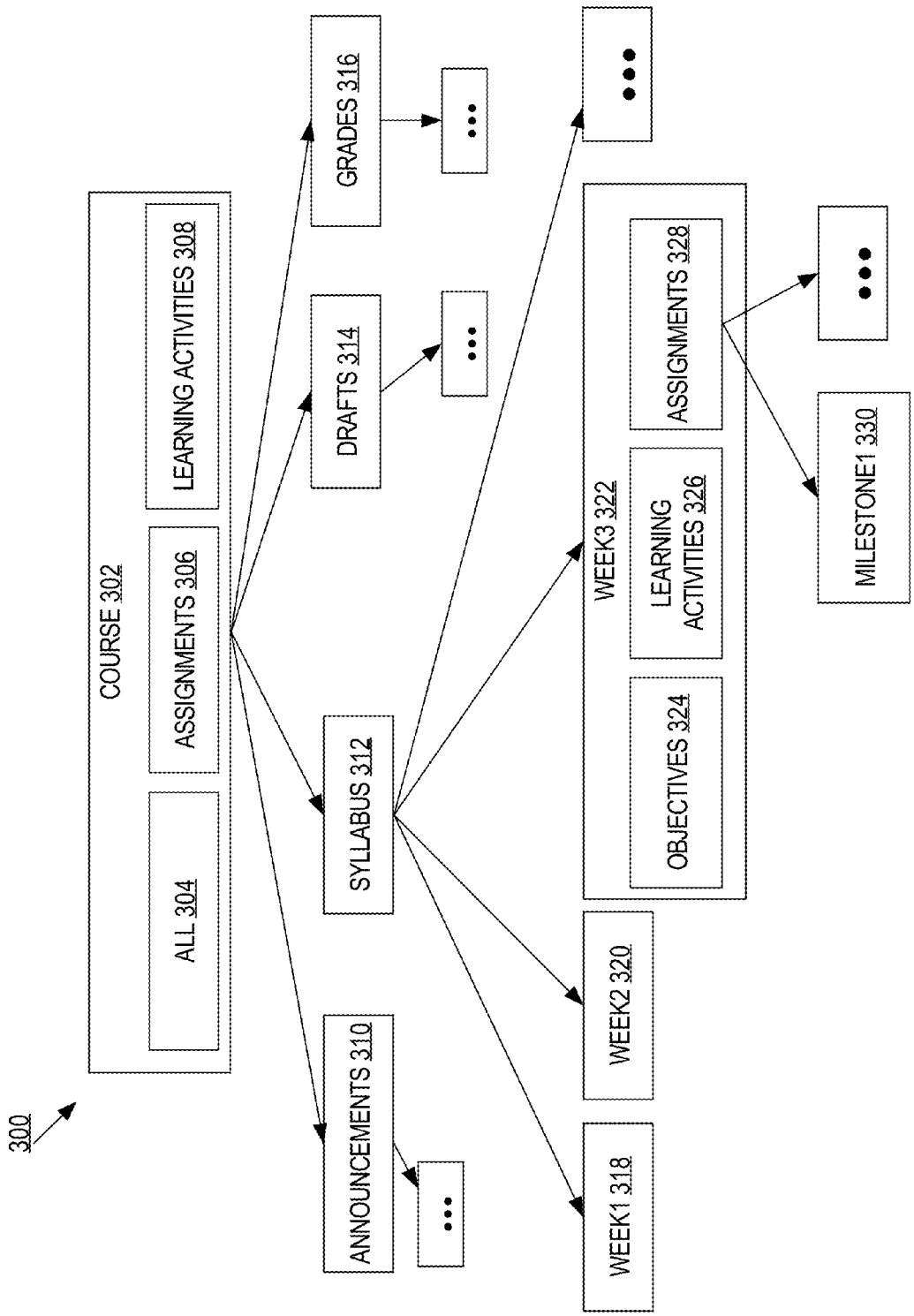
FIG. 3 is a block diagram that illustrates a view hierarchy that may be used in an online classroom application.

Referring to FIG. 3, it is a block diagram that illustrates a view hierarchy 300 that may be employed by such an online classroom application. Specifically, a COURSE view 302 may be at the root of the hierarchy 300. In the present example, the COURSE view 302 has three alternative "sibling views". As used herein, sibling views are views that are treated as belonging to the same position in the hierarchy. Thus, navigating between sibling views changes the contents of the display, but does not change the bread-crumb display. In the hierarchy 300 illustrated in FIG. 3, the sibling views associated with the COURSE view 302 are ALL 304, ASSIGNMENTS 306, and LEARNING ACTIVITIES 308.

Immediately below the COURSE view 302 is an ANNOUNCEMENTS view 310, a SYLLABUS view 312, a DRAFTS view 314, and a GRADES view 316. Each of these second-level views has child views. However, for the purpose of explanation, only the child views of the SYLLABUS view 312 are shown. Those child views include a series of "week" views, including WEEK1 view 318, WEEK2 view 320, WEEK3 view 322, etc. Each of the "week" views may have any number of sibling and child views. In the illustrated hierarchy 300, the WEEK3 view 322 is illustrated as having three sibling views 324, 326 and 328. Below the ASSIGNMENTS view 328 are views for the assignments of WEEK3, one of which corresponds to MILESTONE1 view 330.

Example Accordian-Style Bread-Crumb Display

Figure 4A:
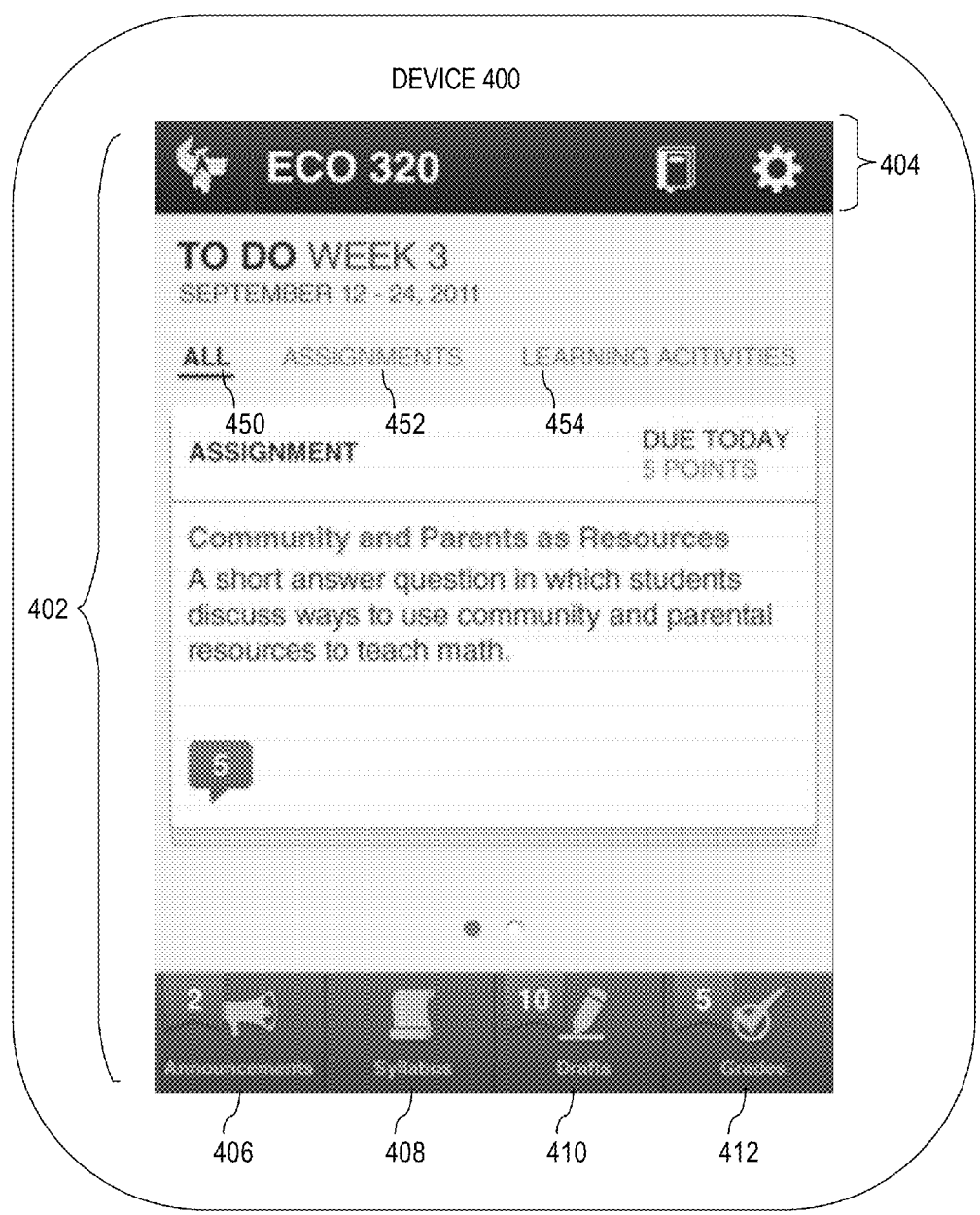
FIGS. 4A-4F are block diagrams that illustrate how an accordion-style bread-crumb display is updated as a user navigates a view hierarchy, according to an embodiment.

Referring to FIG. 4A, it is a block diagram that illustrates a device 400 that has a screen 402 on which is currently displayed the COURSE view 302 for a course entitled "ECO 320". The COURSE view 302 includes controls for navigating between the three sibling views. Specifically, control 450 may be selected to view the ALL view 304, control 452 may be selected to view the ASSIGNMENTS view 306, and control 454 may be selected to view the LEARNING ACTIVITIES view 308. As illustrated in FIG. 4A, the ALL view 304 is currently being displayed.

Screen 402 also displays controls for navigating to the views that are immediately below the COURSE view 302 in the hierarchy 300. Specifically, controls 406, 408, 410 and 412 respectively navigate the user to ANNOUNCEMENTS view 310, SYLLABUS view 312, DRAFTS view 314, and GRADES view 316.

Screen 402 also displays a bread-crumb display 404 whose operation shall be described hereafter with respect to navigation through hierarchy 300. In FIG. 4A, screen 402 is currently displaying the ALL view 304 of the COURSE view 302. Consequently, the bread-crumb display 404 displays the label associated with COURSE view 302. In the present example, the label associated with the COURSE view 302 is "ECO 320". For the purpose of explanation, it shall be assumed that a user selects control 408 to navigate to the SYLLABUS view 312. In response to selection of control 408, the display on screen 402 transitions from the display shown in FIG. 4A to the display shown in FIG. 4B. The specific manner in which the transition is performed may vary from implementation to implementation. Examples are given hereafter of specific transition techniques that facilitate the use of bread-crumb display 404. However, bread-crumb display 404 may be used in combination with any number of transition techniques.

Figure 4B:
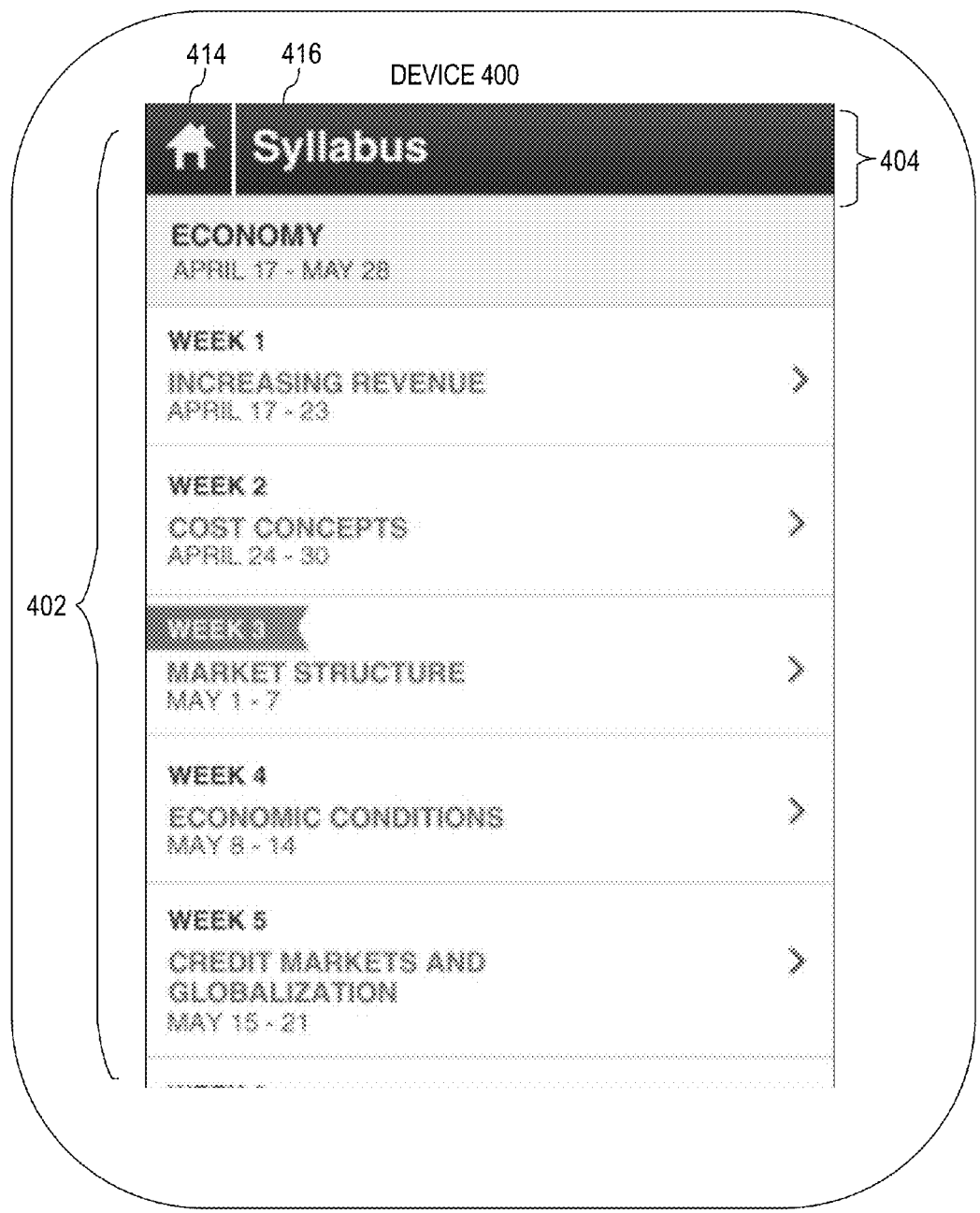

Referring to FIG. 4B, the SYLLABUS view 312 includes a list of weeks, where each entry in the list corresponds to a different "week" view that is below the SYLLABUS view 312 in the view hierarchy 300. In response to the navigation to the SYLLABUS view 312, the bread-crumb display 404 has also been updated. In the embodiment illustrated in FIG. 4B, the label "ECO 320" has been replaced with a smaller indicator 414 of the COURSE view 302, and an indicator 416 for the SYLLABUS view 312 has been added. Specifically, the indicator 414 for the COURSE view 302 is now a representation of a house, which takes less space to display than the label "ECO 320".

The transition between the COURSE view 302 in FIG. 4A and the SYLLABUS view 312 in FIG. 4B illustrates the general principle that: (a) each view may have multiple, differently-sized bread-crumb display representations, and (b) the size of the bread-crumb display representation of a given view decreases as the number of levels between the given view and the current view increases. Thus, in FIG. 4A where the COURSE view 302 is the current view, the bread-crumb display representation of the COURSE view 302 is the entire label "ECO 320". In FIG. 4B where the COURSE view 302 is one level below the current view, the bread-crumb display representation of the COURSE view 302 is the smaller house-icon representation. As indicators for new levels are added to the bread-crumb display 404, the indicators for the already-display levels are compressed in a manner that is analogous to an accordion being squeezed. Hence, bread-crumb display 404 is referred to herein as an accordion-style bread-crumb display.

Figure 4C:
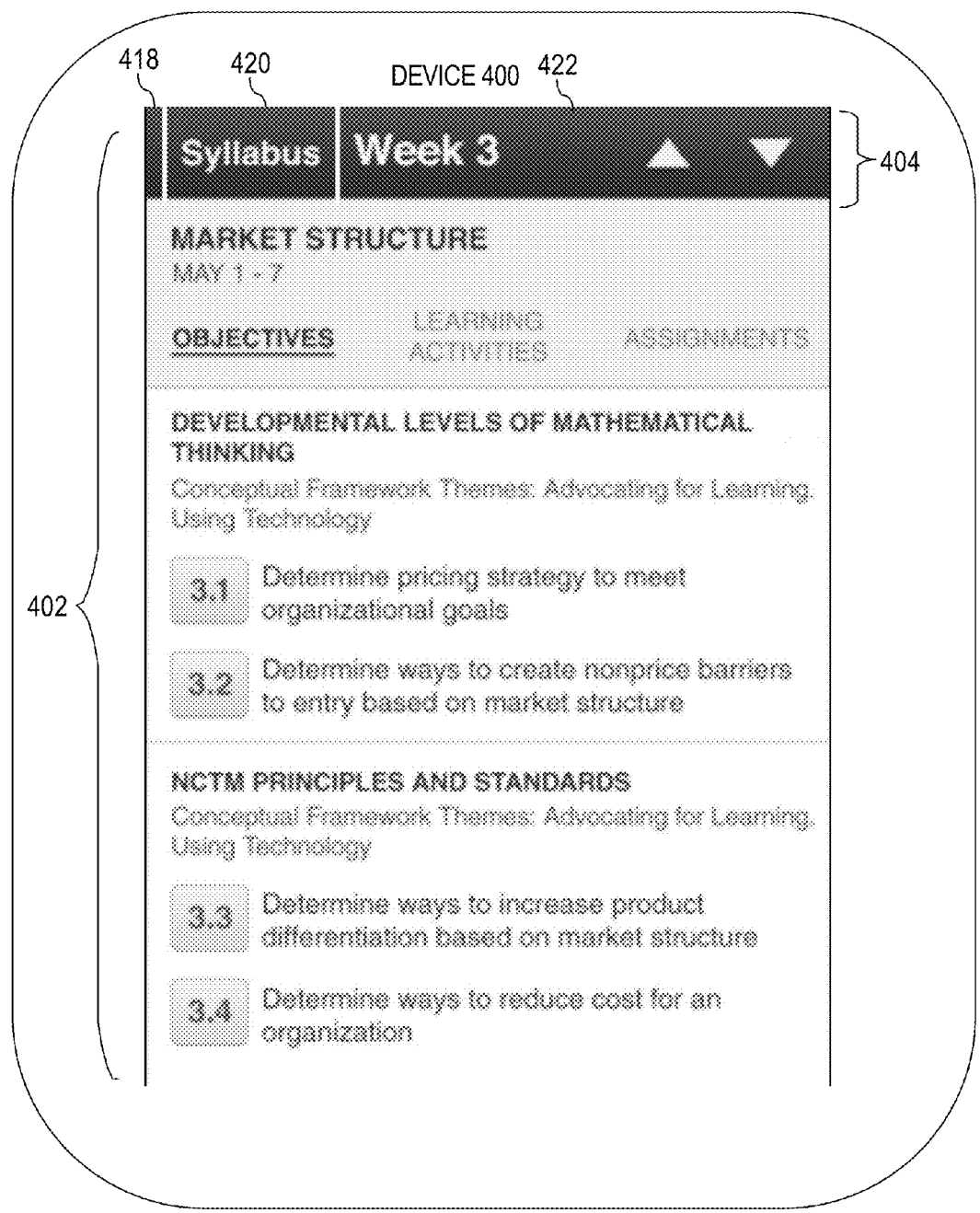

By selecting a week entry in the list of weeks, a user may navigate down yet another level in the view hierarchy 300. For the purpose of illustration, it shall be assumed that a user selects the "week 3" entry to navigate to the WEEK3 view 322 in the hierarchy 300. In response to the selection of the week 3 entry, the display on screen 402 transitions from the display shown in FIG. 4B to the display shown in FIG. 4C. As illustrated in FIG. 4C, the OBJECTIVES view 324 of WEEK3 view 322 has become the current view. In response to the transition to the OBJECTIVES view 324, the bread-crumb display 404 has been updated. Specifically, the indicator 418 for the COURSE view 302 has changed from the house icon to a small tab that has no label at all. In addition, the indicator 420 for the SYLLABUS view 312 has shifted left and shrunk, though the indicator 420 still includes the entire SYLLABUS label (albeit in a smaller font). In addition, an indicator 422 for the new current view has been added.

Again in FIG. 4C, the more hierarchical levels between a given view and the current view, the more compressed the representation of the current view becomes. However, even though the level indicators may become so compressed that they cease to display any identifying labels, the bread-crumb display 404 continues to display indicators for all levels. Continuing to display indicators for all levels, even when the labels themselves do not fit, can significantly help the user keep track of the depth, within the view hierarchy, of the current view. For example, bread-crumb display 404 illustrated in FIG. 4C quickly conveys to a user that the current view is at the third level in the view hierarchy 300.

Figure 4D:
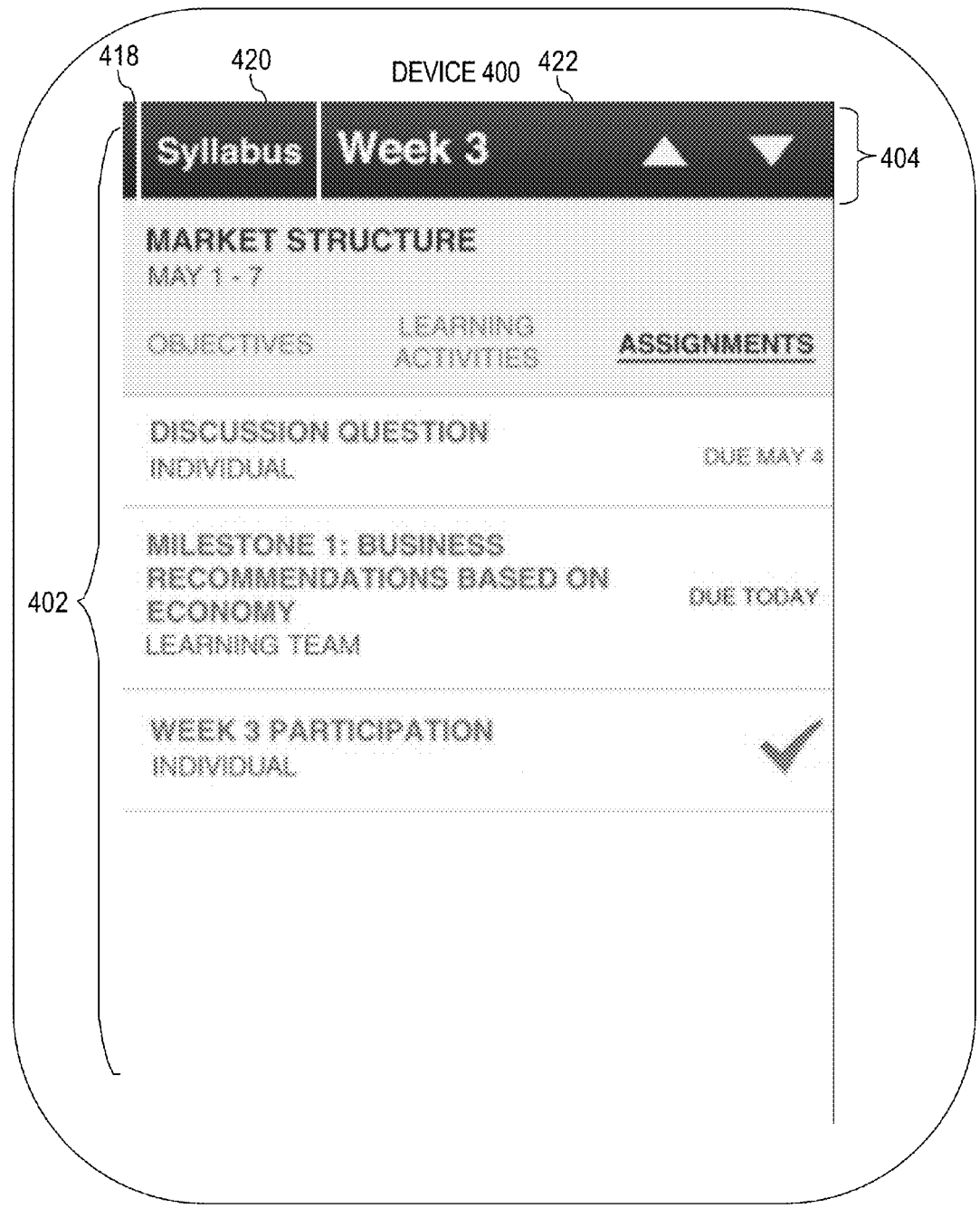

In FIG. 4C, the WEEK3 view 322 has controls for navigating between the three sibling views 324, 326 and 328. In FIG. 4C, the OBJECTIVES view 324 is the current view. Selecting the ASSIGNMENTS control causes screen 402 to transition to the ASSIGNMENTS view 328, as illustrated in FIG. 4D. Because the transition between the OBJECTIVES view 324 and the ASSIGNMENTS view 328 is a transition between sibling views, and not a traversal down the view hierarchy, bread-crumb display 404 remains unchanged between FIGS. 4C and 4D.

In FIG. 4D, screen 402 displays the assignments for Week 3. In the present example, Week 3 has three assignments, each of which is represented by an entry in an assignment list. Selecting any entry in the assignment list causes navigation down one level in hierarchy 300 to a view corresponding to the selected assignment. For the purpose of illustration, it shall be assumed that the user selects the "Milestone 1" entry. In response to selection of the "Milestone 1" entry, the user navigates from the ASSIGNMENTS view 328 of Week 3 to the MILESTONE1 view 330, which is illustrated in FIG. 4E.

Figure 4E:
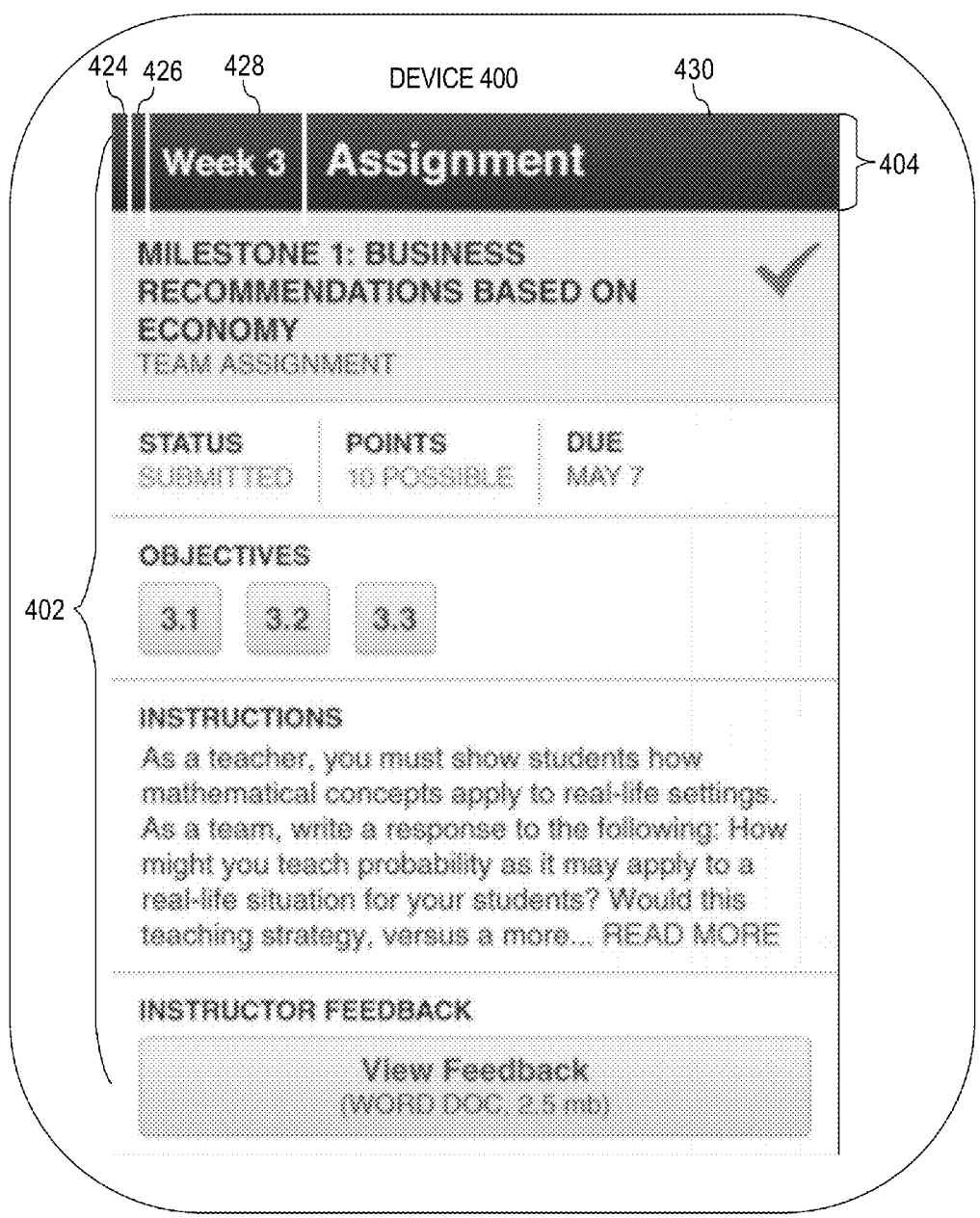

Referring to FIG. 4E, screen 402 illustrates the MILESTONE1 view 330 that contains the details of the Milestone 1 assignment. In addition, transition to view 324 automatically causes bread-crumb display 404 to be updated with in indicator 430 for the MILESTONE1 view 330. Because indicator 430 is the indicator for the current view, the indicator 430 is displayed in relatively large font. To make room for indicator 430, the indicators for one or more of the levels that are above the current level are further compressed. Specifically, the indicator 428 for the WEEK3 view 322 is compressed, showing the label "Week 3" in a smaller font. The indicator 426 for the SYLLABUS view 312 has shrunk to the point that it appears as a mere tab, with no label. The indicator 424 for the COURSE view 302 remains unchanged, since it is already in its most compressed format.

As illustrated by FIG. 4E, the bread-crumb display 404 continues to display indicators for all traversed levels, and determines the size of the indicator for a level based on how far the level is from the level of the current view. Because the bread-crumb display 404 continues to display indicators for all levels, the user is always aware of the depth of the current view within the view hierarchy. Further, because more information is displayed in the indicators of the most recently traversed levels, the user is less likely to become confused about the context of the current view.

Expanding the Accordion

According to one embodiment, controls are provided to expand the bread-crumb display 404, like an accordion, without changing the current view. The specific controls used to expand the bread-crumb display 404 may vary from implementation to implementation. For example, if device 400 has a keyboard, the bread-crumb display 404 may be expanded through a particular keystroke combination. Alternatively, device 400 may contain a button, either physical or virtual, that may be activated to expand bread-crumb display 404. Bread-crumb display 404 may also be expanded by dragging the input focus from left to right across bread-crumb display 404. The input focus may be indicated, for example, by a mouse pointer, a user's finger, a stylus, etc.

Figure 4F:
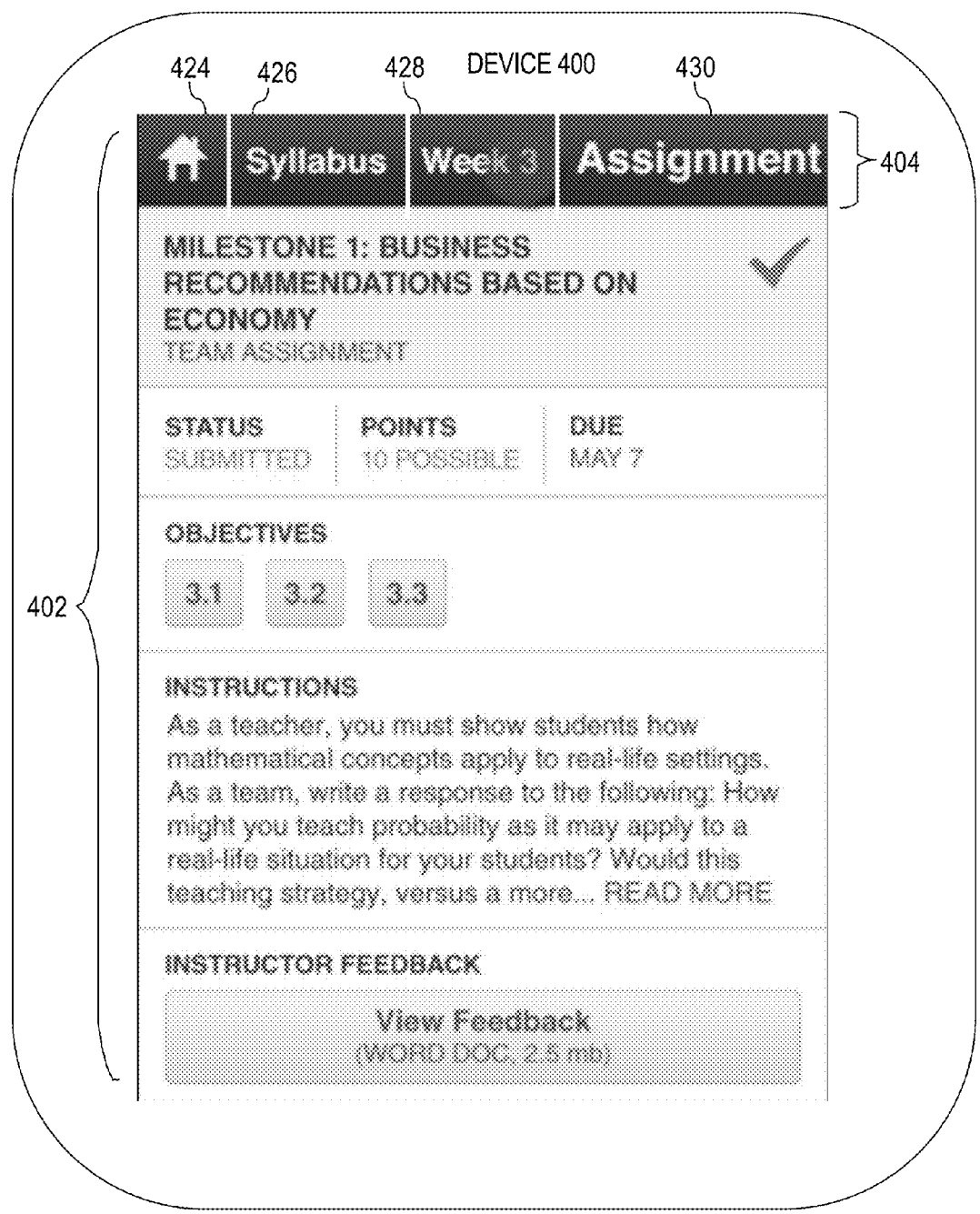

In response to the input to expand bread-crumb display 404, the bread-crumb display 404 is updated to appear as illustrated in FIG. 4F. As illustrated in FIG. 4F, the current view has not changed relative to FIG. 4E. However, the indicators 424, 426 and 428 have expanded, leaving less room for the indicator 430 of the current level. In its expanded state, bread-crumb display 404 conveys more precisely the path through which the user navigated to arrive at the current view.

Random Access Using the Bread-Crumb Display

According to one embodiment, bread-crumb display 404 is designed with controls to allow a user to perform "random access navigation". That is, the user may navigate directly from the current view to any view for which the bread-crumb display 404 includes an indicator. The nature of the control may vary from implementation to implementation. For example, an indicator may be selected by keyboard operation, by clicking on the indicator with a mouse, or by touching the indicator with a finger or stylus. In the present example, it shall be assumed that device 400 has a touch sensitive screen, and that the user activates indicator 428. In response to activation of indicator 428, the user navigates to the assignments view 328, as illustrated in FIG. 4D.

As illustrated in FIG. 4D, the bread-crumb display 404 displays the indicator 422 in expanded form, because the ASSIGNMENTS view 328 is once again the current view. In addition, bread-crumb display 404 has compressed once again, causing the indicators 418 and 420 to be displayed in a more compressed form. From the display illustrated in FIG. 4D, the user may navigate up to the SYLLABUS view 312 by selecting indicator 420, or to the COURSE view 302 by selecting indicator 418. Thus, selecting indicator 418 or 420 will respectively return the user to the display shown in FIG. 4A or 4B.

Updating the Bread-Crumb Display

As explained above, as a user navigates down a level in the view hierarchy 300, the bread-crumb display 404 is updated in a way that adds an indicator for the new level and compresses one or more of the already-displayed indicators. According to one embodiment, the update is not performed instantaneously. Rather, the update is performed in an animated fashion to provide the visual cues necessary to indicate to the user what is transpiring. Specifically, in one embodiment, in response to the user navigating down a level in the view hierarchy 300, both the view to which the user is navigating (the "target view"), and an indicator for the target view, slide onto the screen 402 from right to left. The target view continues to slide onto the screen until the target view has completely replaced the previous view. However, the indicator for the target view stops before replacing the already-existing indicators on the bread-crumb display 404. Rather than be replaced, one or more of the already-existing level indicators are compressed to make room for the indicator for the level of the target view.

FIGS. 5A to 5D give an example of the animated manner in which the display changes in response to navigating down a level in the view hierarchy 300. Specifically, referring to FIG. 5A, the screen 402 of device 400 is currently displaying SYLLABUS view 312. Bread-crumb display 404 include an indicator 500 for the level of the COURSE view 302, and an indicator 502 for the level of the SYLLABUS view 312.

Figure 5A:
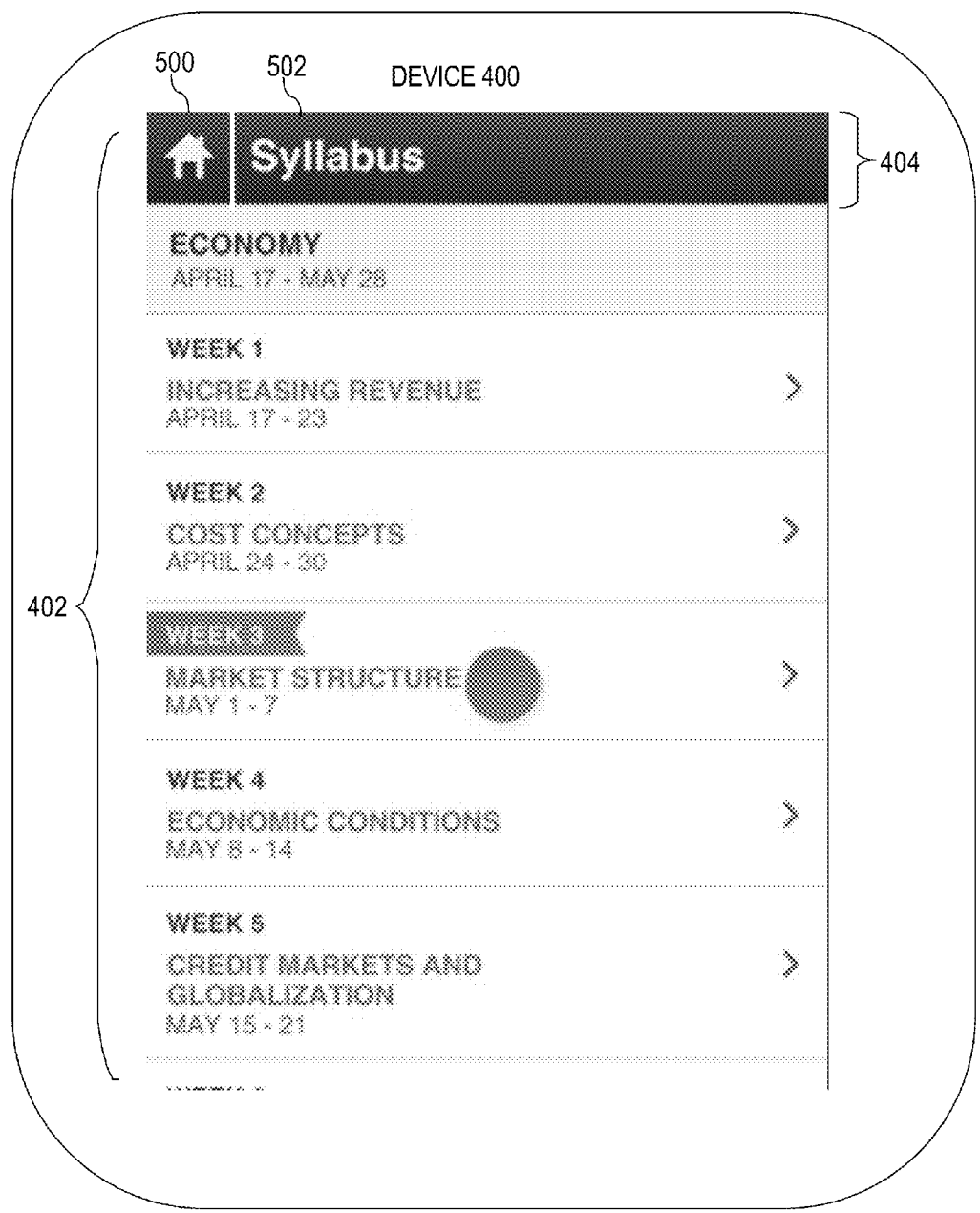
FIGS. 5A-5D are block diagrams that illustrate how navigation down a view hierarchy may be animated, according to an embodiment.
Figure 5B:

For the purpose of illustration, it shall be assumed that the user selects to navigate to the "week 3" view 322 and, more specifically, to the OBJECTIVES view 324 of week 3. In response to receiving user input to navigate to OBJECTIVES view 324, the OBJECTIVES view 324 begins to slide onto the screen 402 from right to left, while the SYLLABUS view 312 slides off the screen from right to left at the same rate. FIG. 5B illustrates the point in time where a portion 520 of OBJECTIVES view 324 has slid onto screen 402, while a portion of the SYLLABUS view 312 has slid off. The border 524 between the views moves from the far right edge of screen 402 to the far left edge of screen 402 in the direction indicated by arrow 526.

Figure 5C:
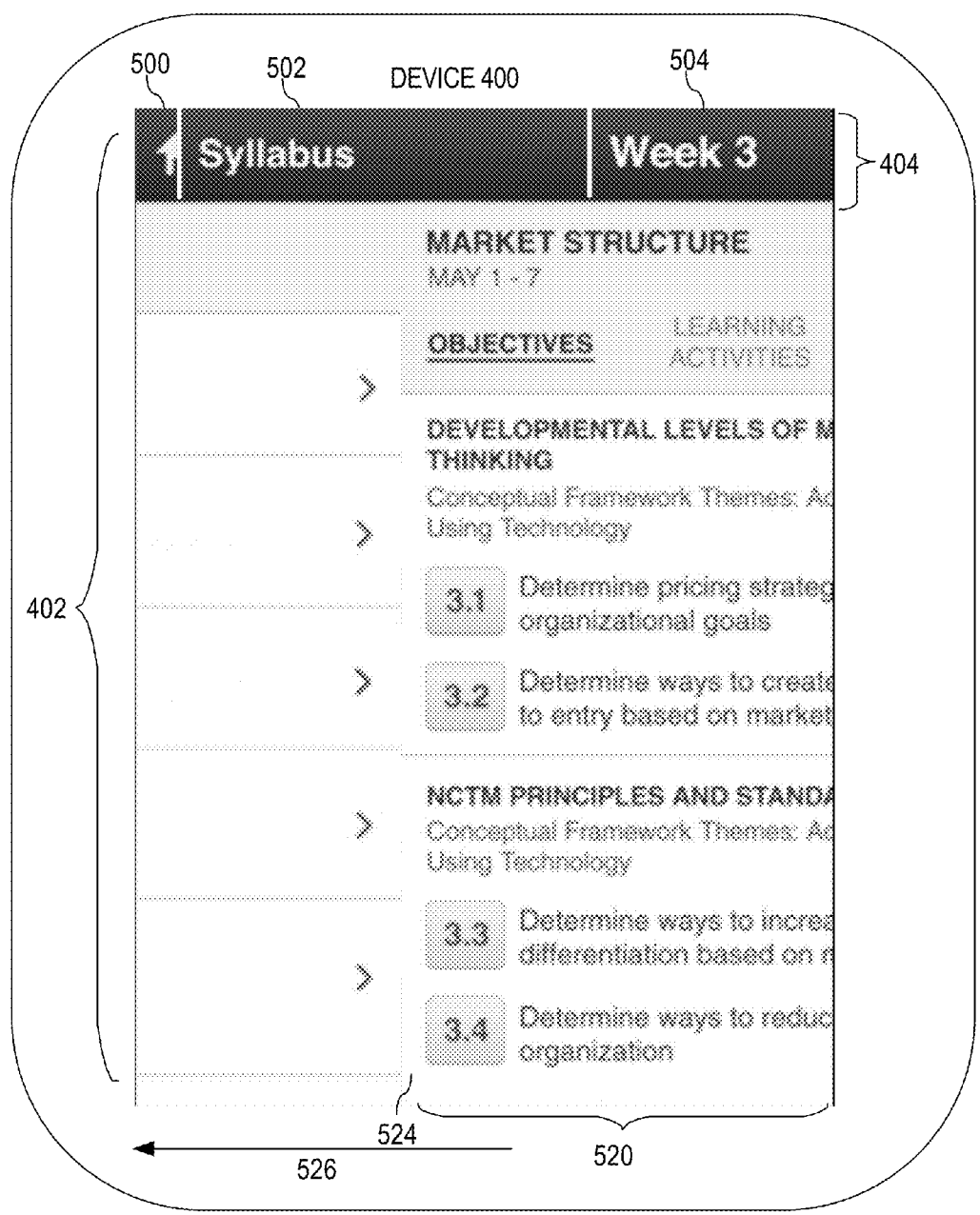

In FIG. 5C, both the SYLLABUS view 312 and the OBJECTIVES view 324 have moved further to the left, this increasing the size of the portion 520 of the OBJECTIVES view 324 that is visible. In addition, an indicator 504 has moved onto the bread-crumb display 404, moving from right to left. One or more of the existing indicators 500 and 502 become compressed to make room for the indicator 504 of the target view, but are never completely pushed off the screen 402.

Figure 5D:
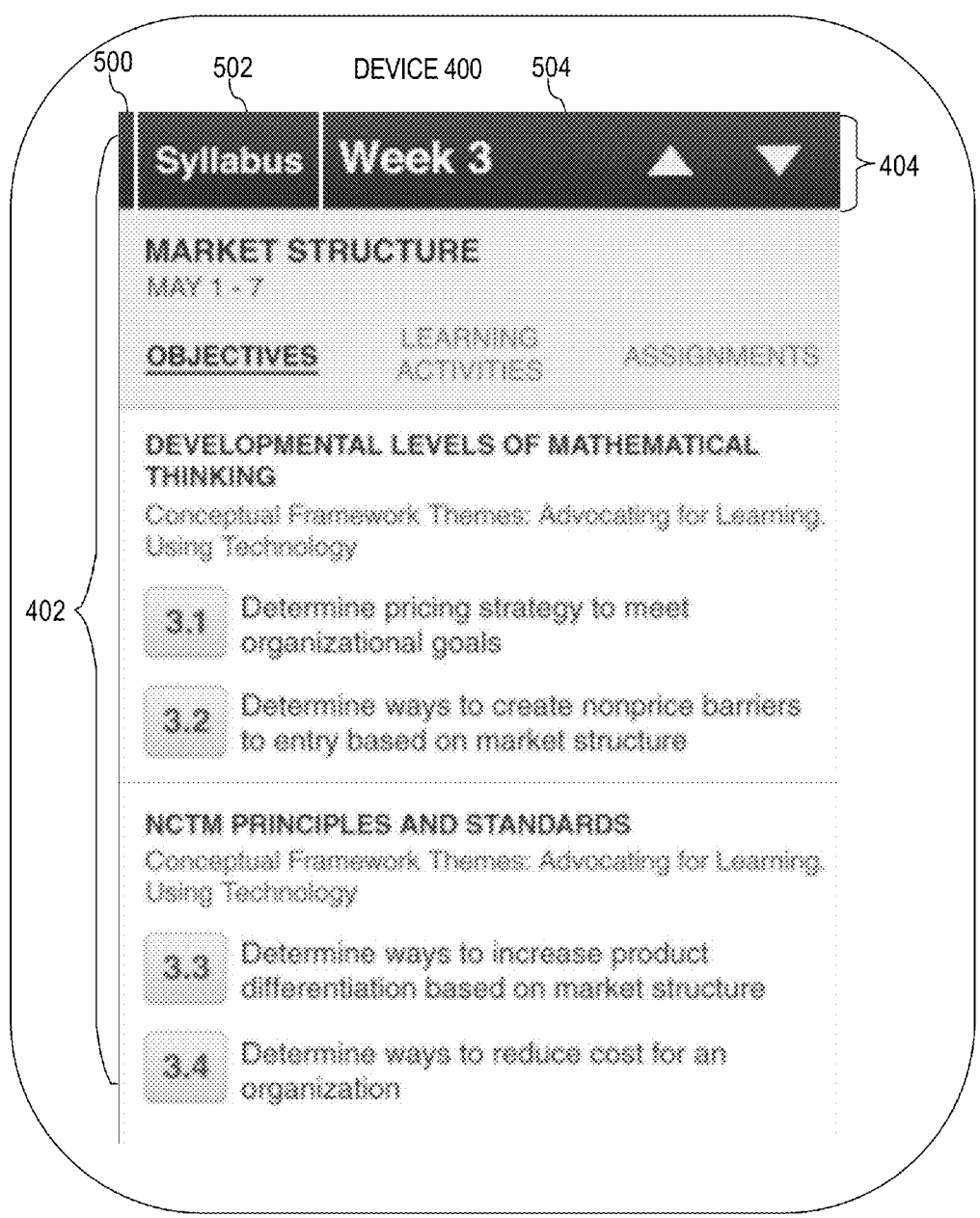

In FIG. 5D, the OBJECTIVES view 324 has moved entirely onto screen 402, and the SYLLABUS view 312 has been completely pushed off. The right-to-left movement of indicator 504 has stopped, leaving a compressed indicator 502 and a highly-compressed indicator 500. Because the user sees the indicator for the level of the target view move onto the screen 402 in conjunction with the target view to which the indicator pertains, it is easier for the user to maintain the mental association between that indicator and the view. Because the compression of already-existing indicators occurs in an animated fashion, the user can easily comprehend the compressed level indications are merely compressed versions of the previously-displayed uncompressed level indications.

Figure 6A:
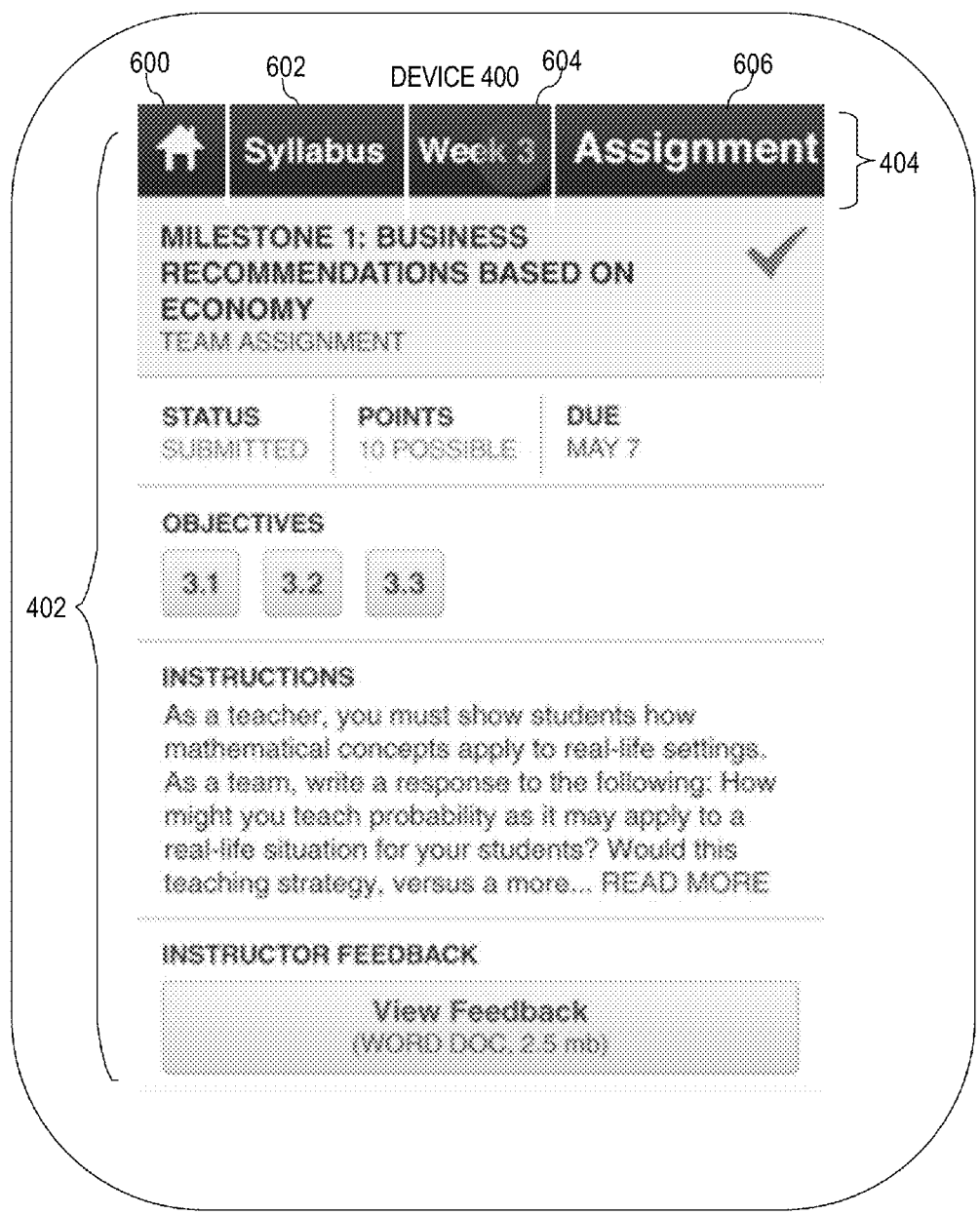
FIGS. 6A-6D are block diagrams that illustrate how navigation up a view hierarchy using a bread-crumb display may be animated, according to an embodiment.
Figure 6B:
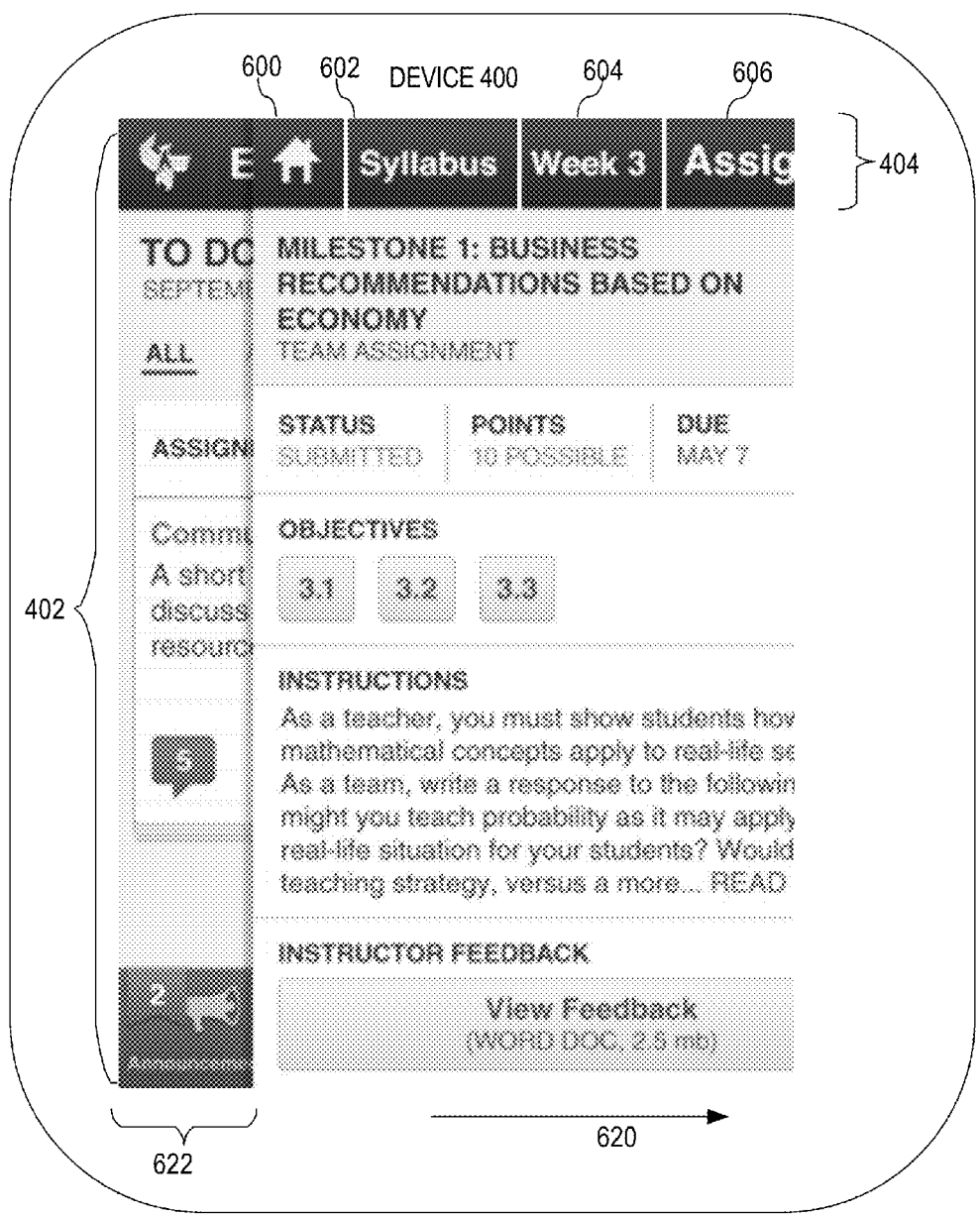

In addition to animating the display changes that occur when a user navigates to a lower-level view, techniques are provided for animating the display changes that occur when a user navigates to a higher-level view through interaction with the bread-crumb display 404. Specifically, referring to FIG. 6A, it is a block diagram in which the user has expanded the bread-crumb display 404 while viewing the MILESTONE1 view 330. The expanded bread-crumb display 404 includes several indicators 600, 602, 604 and 606, where indicator 606 is for the level associated with the current view. In response to selection of indicator 604, the user navigates from the MILESTONE1 view 330 to the target view (in this case, ASSIGNMENTS view 328). However, rather than have the view change be instantaneous, the change is animated. In particular, the MILESTONE1 view 330 moves off the screen from left to right to reveal the target view. FIG. 6B illustrates the screen 402 at the point in time where the MILESTONE1 view 330 has moved sufficiently to the right (as indicated by arrow 620) to reveal a portion 622 of the target view. In the illustrated embodiment, the entire bread-crumb display 404 of the current window moves to the right in conjunction with the MILESTONE1 view 330 itself.

Figure 6C:
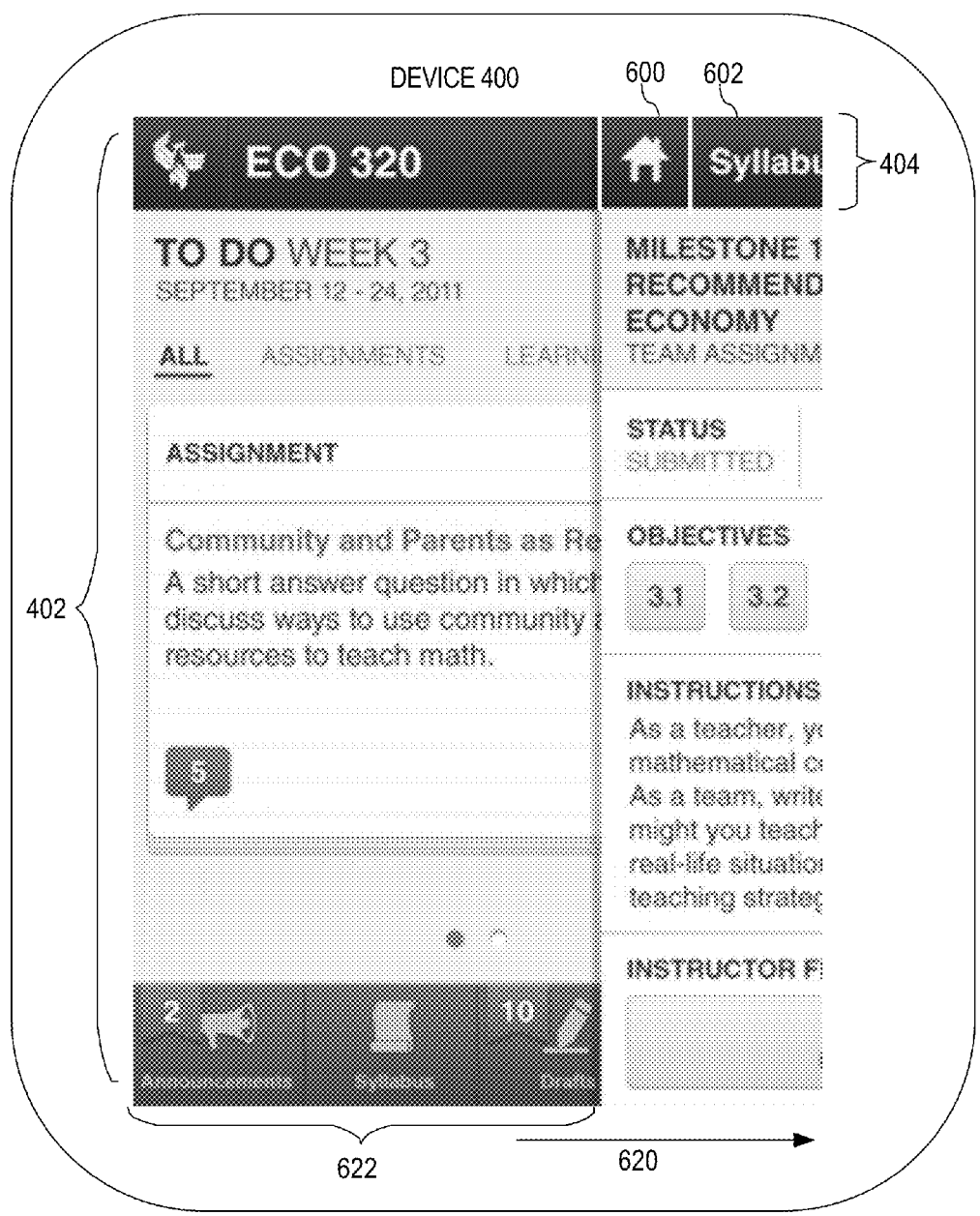
Figure 6D:
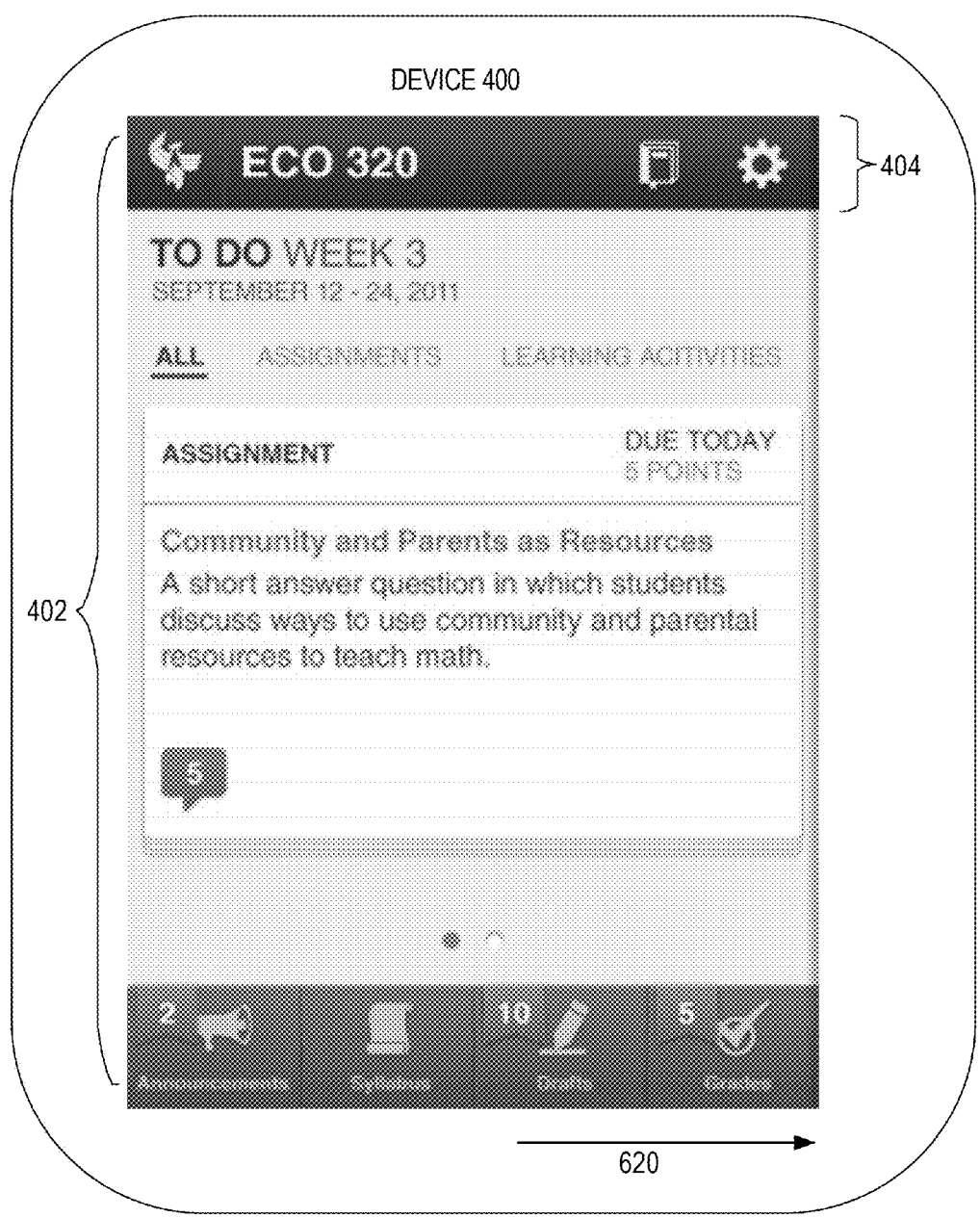

FIG. 6C illustrates the screen 402 after the MILESTONE1 view 330 has moved further to the right, revealing a larger portion 622 of the target view. FIG. 6D illustrates screen 402 after the MILESTONE1 view 330 has been completely removed from screen 402 to reveal the target view 328 to which the user navigated using the expanded bread-crumb display 404.

The example animations described above in relation to FIGS. 5A-5D and 6A-6D are merely examples of how animation may be used in conjunction with navigation operations to assist a user in keeping track of the user's position within a view hierarchy. As depicted in FIGS. 5A-5D, target views may "push" the current view out of the viewing region. In such an embodiment, when the navigation is to a lower level, the level indicators for the target view may cause the existing indicators to visibly compress to make room for the new level indicator. Similarly, when navigation is to a higher level, the level indicators that remain on the screen may visibly expand as the level indicator of the current level moves off the screen.

Alternatively, as depicted in FIGS. 6A-6D, a target view may be revealed below the current view as the current view moves off the screen. When navigating down the hierarchy, the bread-crumb display that is revealed will include one more indicator than the bread-crumb display that is moved off the screen. When navigating up the hierarchy using the bread-crumb display, the revealed bread-crumb display will have fewer level indicators than the bread-crumb display that is moved off the screen.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
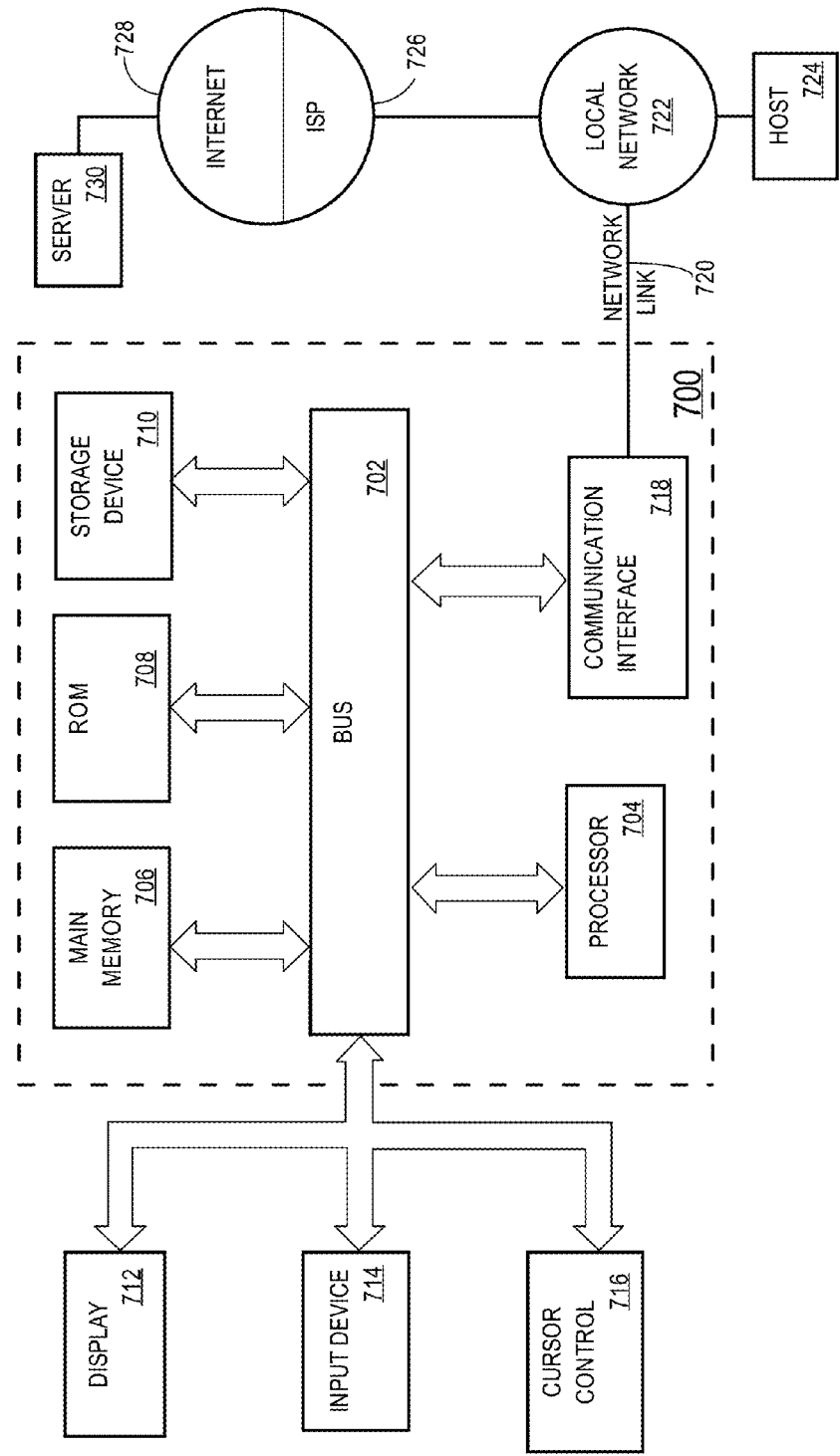
FIG. 7 is a block diagram of a computing device upon which embodiments of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
causing concurrent display of:
   a) a current view that resides at a first position within a view hierarchy; and
   b) a bread-crumb display that includes a plurality of indicators, wherein the plurality of indicators include an indicator of the current view and indicators for one or more ancestor views of the current view;
wherein there is a pre-established size for the bread-crumb display;
receiving input that establishes a target view as a new current view, wherein the target view is below the current view in the view hierarchy;
wherein the target view is associated with a first label that the bread-crumb display does not have sufficient unused space to display at the time the input is received;
in response to receiving said input, performing the steps of:
   detecting that adding an indicator for the target view into the bread-crumb display would exceed the pre-established size for the bread-crumb display;
   in response to detecting that adding an indicator for the target view into the bread-crumb display would exceed the pre-established size for the bread-crumb display, compressing one or more of the plurality of indicators to allow space, within the bread-crumb display, to display the first label;
   adding to the bread-crumb display an indicator for the target view while continuing to display, within the bread-crumb display, each of the plurality of indicators; and
   causing display of the current view to be replaced with display of the target view, thereby establishing the target view to be the new current view;
wherein the indicator added to the bread-crumb display for the target view includes the first label;
wherein the plurality of indicators includes multiple compressed indicators; and
wherein a degree to which a particular indicator, of the plurality of indicators, is compressed is based, at least in part, on how many levels are between the current view and the view that corresponds to the particular indicator;
wherein the method is performed by one or more computing devices.

2. The method of claim 1 wherein compressing one or more of the plurality of indicators further comprises compressing multiple indicators of the plurality of indicators.

3. The method of claim 1 wherein compressing one or more of the plurality of indicators includes changing at least one indicator, of the plurality of indicators, from an indicator that displays a label to an indicator that displays no label.

4. The method of claim 1 wherein causing display of the current view to be replaced with display of the target view comprises displaying an animation in which the target view pushes the current view off a display region.

5. The method of claim 4 wherein the indicator for the target view moves onto the bread-crumb display in the same direction and speed as the direction and speed at which the target view moves into the display region.

6. The method of claim 1 further comprising enabling a user to navigate directly from the current view to any view for which the bread-crumb display includes an indicator.

7. The method of claim 1 further comprising:
receiving second input that does not cause navigation to a different view than the current view;
in response to the second input, expanding one or more of the plurality of indicators.

8. The method of claim 7 wherein:
the plurality of indicators include multiple compressed indicators; and
expanding one or more of the plurality of indicators is performed by expanding all compressed indicators that are in the bread-crumb display.

9. A method comprising:
causing concurrent display of:
   a) a current view that resides at a first position within a view hierarchy; and
   b) a bread-crumb display that includes a plurality of indicators, wherein the plurality of indicators include an indicator of the current view and indicators for one or more ancestor views of the current view;
wherein there is a pre-established size for the bread-crumb display;
receiving input that establishes a target view as a new current view, wherein the target view is below the current view in the view hierarchy;
wherein the target view is associated with a first label that the bread-crumb display does not have sufficient unused space to display at the time the input is received;
in response to receiving said input, performing the steps of:
   detecting that adding an indicator for the target view into the bread-crumb display would exceed the pre-established size for the bread-crumb display;
   in response to detecting that adding an indicator for the target view into the bread-crumb display would exceed the pre-established size for the bread-crumb display, compressing one or more of the plurality of indicators to allow space, within the bread-crumb display, to display the first label;
   wherein the step of compressing one or more of the plurality of indicators includes changing characters, within at least one indicator of the plurality of indicators, from a first font size to a second font size, wherein the second font size is smaller than the first font size;
   adding to the bread-crumb display an indicator for the target view while continuing to display, within the bread-crumb display, each of the plurality of indicators; and
   causing display of the current view to be replaced with display of the target view, thereby establishing the target view to be the new current view;
wherein the indicator added to the bread-crumb display for the target view includes the first label;
wherein the method is performed by one or more computing devices.

10. A method comprising:
causing concurrent display of:
   a) a current view that resides at a first position within a view hierarchy; and
   b) a bread-crumb display that includes a plurality of indicators, wherein the plurality of indicators include an indicator of the current view and indicators for one or more ancestor views of the current view;
wherein there is a pre-established size for the bread-crumb display;
receiving input that establishes a target view as a new current view, wherein the target view is below the current view in the view hierarchy;
wherein the target view is associated with a first label that the bread-crumb display does not have sufficient unused space to display at the time the input is received;

in response to receiving said input, performing the steps of:
  detecting that adding an indicator for the target view into the bread-crumb display would exceed the pre-established size for the bread-crumb display;
  in response to detecting that adding an indicator for the target view into the bread-crumb display would exceed the pre-established size for the bread-crumb display, compressing one or more of the plurality of indicators to allow space, within the bread-crumb display, to display the first label;
  adding to the bread-crumb display an indicator for the target view while continuing to display, within the bread-crumb display, each of the plurality of indicators; and
  causing display of the current view to be replaced with display of the target view, thereby establishing the target view to be the new current view;
wherein the indicator added to the bread-crumb display for the target view includes the first label;
enabling a user to navigate directly from the current view to any view for which the bread-crumb display includes an indicator;
while the current view is the target view, receiving second input that selects a particular indicator of the plurality of indicators;
wherein the particular indicator follows, within the bread-crumb display, a first set of indicators;
wherein the particular indicator is followed, within the bread-crumb display, by a second set of indicators;
in response to the second input, performing the steps of:
  removing the second set of indicators from the bread-crumb display;
  expanding one or more indicators, of the first set of indicators, in the bread-crumb display; and
  causing display of the current view to be replaced by a view that corresponds to the particular indicator;
wherein the method is performed by one or more computing devices.

11. One or more non-transitory storage media storing instructions which, when executed by one or more computing devices, cause performance of a method comprising the steps of:
  causing concurrent display of:
    a) a current view that resides at a first position within a view hierarchy; and
    b) a bread-crumb display that includes a plurality of indicators, wherein the plurality of indicators include an indicator of the current view and indicators for one or more ancestor views of the current view;
  wherein there is a pre-established size for the bread-crumb display;
  receiving input that establishes a target view as a new current view, wherein the target view is below the current view in the view hierarchy;
  wherein the target view is associated with a first label that the bread-crumb display does not have sufficient unused space to display at the time the input is received;
  in response to receiving said input, performing the steps of:
    detecting that adding an indicator for the target view into the bread-crumb display would exceed the pre-established size for the bread-crumb display;
    in response to detecting that adding an indicator for the target view into the bread-crumb display would exceed the pre-established size for the bread-crumb display, compressing one or more of the plurality of indicators to allow space, within the bread-crumb display, to display the first label;
    adding to the bread-crumb display an indicator for the target view while continuing to display, within the bread-crumb display, each of the plurality of indicators; and
    causing display of the current view to be replaced with display of the target view, thereby establishing the target view to be the new current view;
  wherein the indicator added to the bread-crumb display for the target view includes the first label;
  wherein the plurality of indicators includes multiple compressed indicators; and
  wherein the degree to which a particular indicator, of the plurality of indicators, is compressed is based, at least in part, on how many levels are between the current view and the view that corresponds to the particular indicator.

12. The one or more non-transitory storage media of claim 11 wherein compressing one or more of the plurality of indicators further comprises compressing multiple indicators of the plurality of indicators.

13. The one or more non-transitory storage media of claim 11 wherein compressing one or more of the plurality of indicators includes changing at least one indicator, of the plurality of indicators, from an indicator that displays a label to an indicator that displays no label.

14. The one or more non-transitory storage media of claim 11 wherein causing display of the current view to be replaced with display of the target view comprises displaying an animation in which the target view pushes the current view off a display region.

15. The one or more non-transitory storage media of claim 14 wherein the indicator for the target view moves onto the bread-crumb display in the same direction and speed as the direction and speed at which the target view moves into the display region.

16. The one or more non-transitory storage media of claim 11 further comprising enabling a user to navigate directly from the current view to any view for which the bread-crumb display includes an indicator.

17. The one or more non-transitory storage media of claim 11 further comprising:
  receiving second input that does not cause navigation to a different view than the current view;
  in response to the second input, expanding one or more of the plurality of indicators.

18. The one or more non-transitory storage media of claim 17 wherein:
  the plurality of indicators include multiple compressed indicators; and
  expanding one or more of the plurality of indicators is performed by expanding all compressed indicators that are in the bread-crumb display.

19. One or more non-transitory storage media storing instructions which, when executed by one or more computing devices, cause performance of a method comprising the steps of:
  causing concurrent display of:
    a) a current view that resides at a first position within a view hierarchy; and
    b) a bread-crumb display that includes a plurality of indicators, wherein the plurality of indicators include an indicator of the current view and indicators for one or more ancestor views of the current view;
  wherein there is a pre-established size for the bread-crumb display;
  receiving input that establishes a target view as a new current view, wherein the target view is below the current view in the view hierarchy;

wherein the target view is associated with a first label that the bread-crumb display does not have sufficient unused space to display at the time the input is received;

in response to receiving said input, performing the steps of:
  detecting that adding an indicator for the target view into the bread-crumb display would exceed the pre-established size for the bread-crumb display;
  in response to detecting that adding an indicator for the target view into the bread-crumb display would exceed the pre-established size for the bread-crumb display, compressing one or more of the plurality of indicators to allow space, within the bread-crumb display, to display the first label;
  wherein the step of compressing one or more of the plurality of indicators includes changing characters, within at least one indicator of the plurality of indicators, from a first font size to a second font size, wherein the second font size is smaller than the first font size;
  adding to the bread-crumb display an indicator for the target view while continuing to display, within the bread-crumb display, each of the plurality of indicators; and
  causing display of the current view to be replaced with display of the target view, thereby establishing the target view to be the new current view;
wherein the indicator added to the bread-crumb display for the target view includes the first label.

20. One or more non-transitory storage media storing instructions which, when executed by one or more computing devices, cause performance of a method comprising the steps of:
  causing concurrent display of:
    a) a current view that resides at a first position within a view hierarchy; and
    b) a bread-crumb display that includes a plurality of indicators, wherein the plurality of indicators include an indicator of the current view and indicators for one or more ancestor views of the current view;
  wherein there is a pre-established size for the bread-crumb display;
  receiving input that establishes a target view as a new current view, wherein the target view is below the current view in the view hierarchy;
  wherein the target view is associated with a first label that the bread-crumb display does not have sufficient unused space to display at the time the input is received;
  in response to receiving said input, performing the steps of:
    detecting that adding an indicator for the target view into the bread-crumb display would exceed the pre-established size for the bread-crumb display;
    in response to detecting that adding an indicator for the target view into the bread-crumb display would exceed the pre-established size for the bread-crumb display, compressing one or more of the plurality of indicators to allow space, within the bread-crumb display, to display the first label;
    adding to the bread-crumb display an indicator for the target view while continuing to display, within the bread-crumb display, each of the plurality of indicators; and
    causing display of the current view to be replaced with display of the target view, thereby establishing the target view to be the new current view;
  wherein the indicator added to the bread-crumb display for the target view includes the first label;
  enabling a user to navigate directly from the current view to any view for which the bread-crumb display includes an indicator;
  while the current view is the target view, receiving second input that selects a particular indicator of the plurality of indicators;
  wherein the particular indicator follows, within the bread-crumb display, a first set of indicators;
  wherein the particular indicator is followed, within the bread-crumb display, by a second set of indicators;
  in response to the second input, performing the steps of:
    removing the second set of indicators from the bread-crumb display;
    expanding one or more indicators, of the first set of indicators, in the bread-crumb display; and
    causing display of the current view to be replaced by a view that corresponds to the particular indicator.

21. A device comprising:
  one or more processors;
  memory operatively coupled to the one or more processors;
  a display mechanism;
  instructions, stored in the memory, which when executed by the one or more processors cause performance of a method that includes:
    causing concurrent display, on the display mechanism, of:
      a) a current view that resides at a first position within a view hierarchy; and
      b) a bread-crumb display that includes a plurality of indicators, wherein the plurality of indicators include an indicator of the current view and indicators for one or more ancestor views of the current view;
    wherein there is a pre-established size for the bread-crumb display;
    receiving input that establishes a target view as a new current view, wherein the target view is below the current view in the view hierarchy;
    wherein the target view is associated with a first label that the bread-crumb display does not have sufficient unused space to display at the time the input is received;
    in response to receiving said input, performing the steps of:
      detecting that adding an indicator for the target view into the bread-crumb display would exceed the pre-established size for the bread-crumb display;
      in response to detecting that adding an indicator for the target view into the bread-crumb display would exceed the pre-established size for the bread-crumb display, compressing one or more of the plurality of indicators to allow space, within the bread-crumb display, to display the first label;
      adding to the bread-crumb display an indicator for the target view while continuing to display, within the bread-crumb display, each of the plurality of indicators; and
      causing display of the current view to be replaced with display of the target view, thereby establishing the target view to be the new current view;
    wherein the indicator added to the bread-crumb display for the target view includes the first label;
    wherein the plurality of indicators includes multiple compressed indicators; and
    wherein the degree to which a particular indicator, of the plurality of indicators, is compressed is based, at least in part, on how many levels are between the current view and the view that corresponds to the particular indicator.

22. The device of claim 21 wherein compressing one or more of the plurality of indicators includes changing at least one indicator, of the plurality of indicators, from an indicator that displays a label to an indicator that displays no label.

23. The device of claim 21 wherein causing display of the current view to be replaced with display of the target view comprises displaying an animation in which the target view pushes the current view off a display region.

* * * * *